R. P. REDMOND.
FRUIT SIZER.
APPLICATION FILED NOV. 5, 1907.
901,188.
Patented Oct. 13, 1908.
3 SHEETS—SHEET 2.
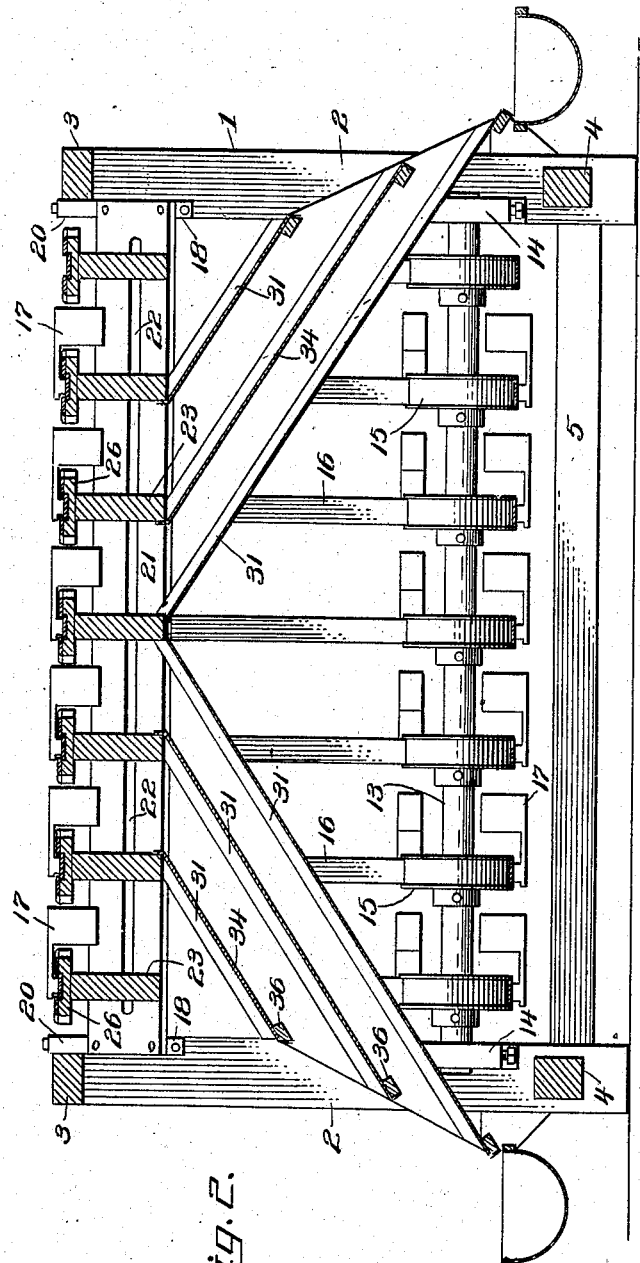
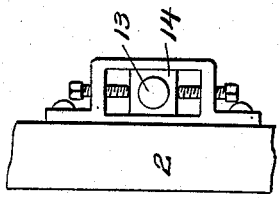
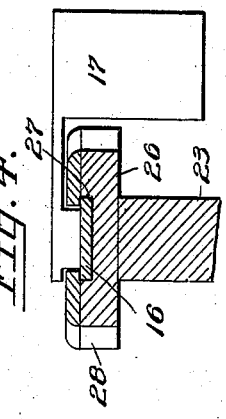
Witnesses
F. C. Gibson.
J. W. Garner
Inventor
Rufus P. Redmond.
By Victor J. Evans
Attorney

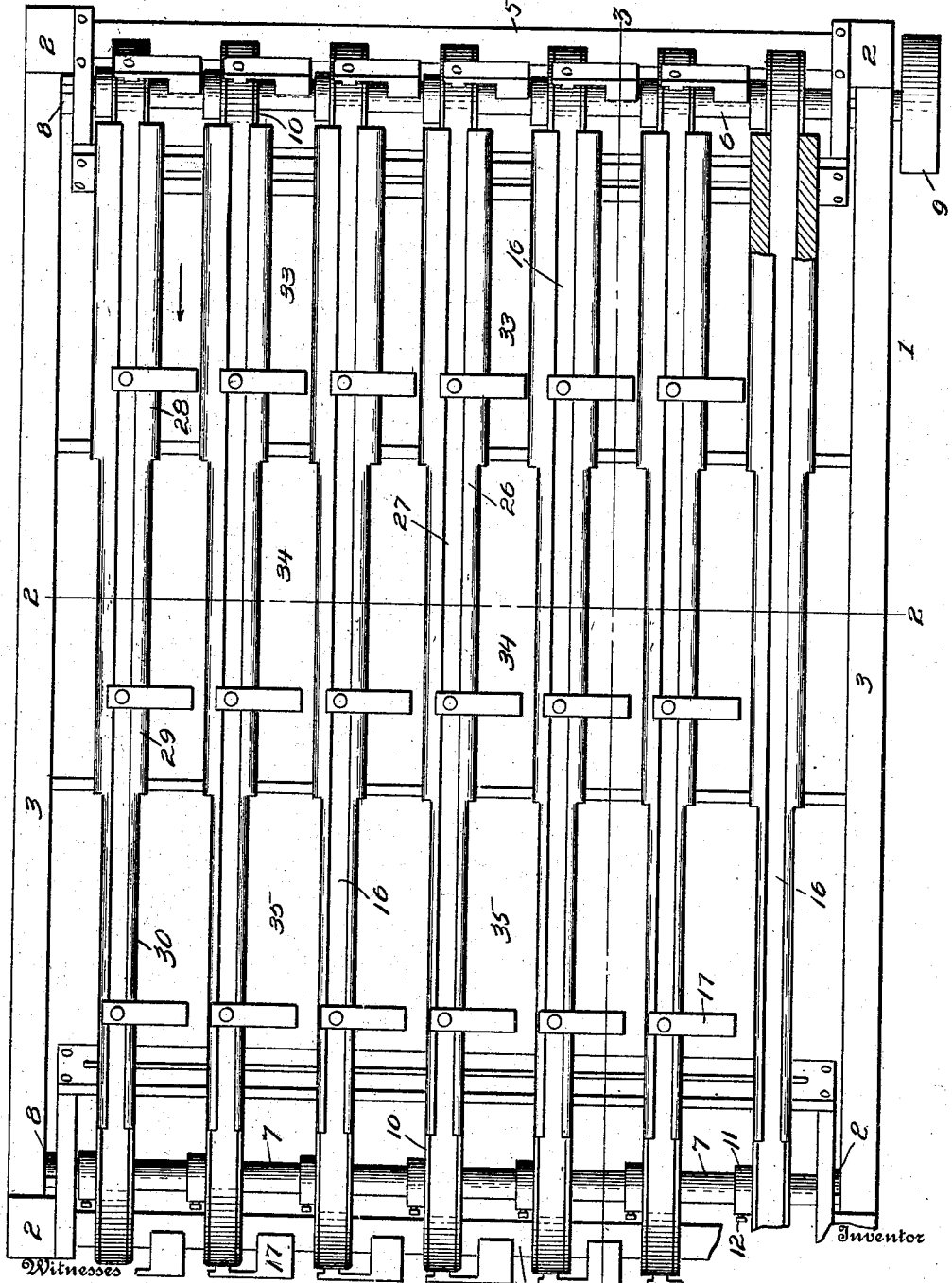

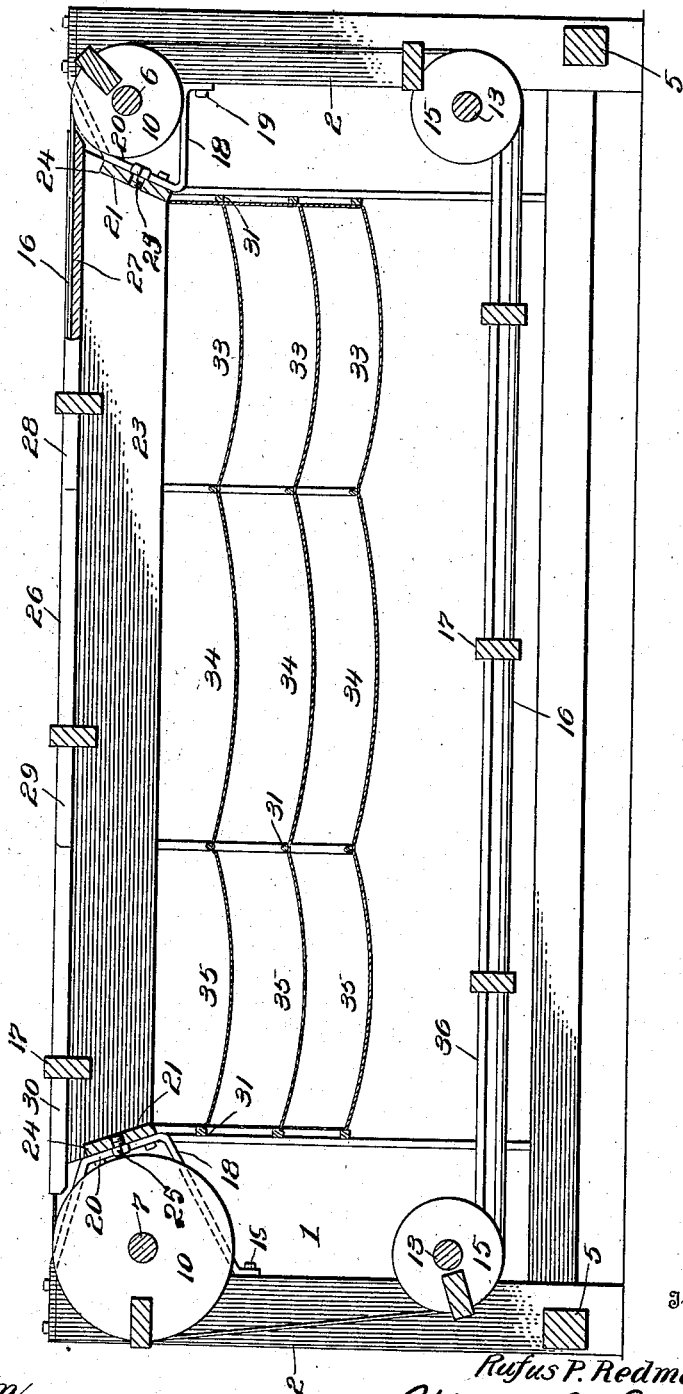

UNITED STATES PATENT OFFICE.

RUFUS P. REDMOND, OF LEWISTON, NEW YORK.

FRUIT-SIZER.

No. 901,188. Specification of Letters Patent. Patented Oct. 13, 1908.

Application filed November 5, 1907. Serial No. 400,776.

*To all whom it may concern:*

Be it known that I, RUFUS P. REDMOND, a citizen of Great Britain, residing at Lewiston, in the county of Niagara and State of New York, have invented new and useful Improvements in Fruit-Sizers, of which the following is a specification.

This invention is an improved fruit sizing machine for assorting fruit according to the respective sizes thereof, and the said invention consists in the construction, combination and arrangement of devices hereinafter described and claimed.

The object of this invention is to provide a machine which is of simple construction, and may be readily manufactured at comparatively small cost, may be driven by the application of comparatively little power, and which operates automatically to assort fruit according to the size thereof.

In the accompanying drawings,—Figure 1 is a top plan view of a fruit sizing machine constructed in accordance with this invention. Fig. 2 is a vertical transverse sectional view of the same taken on the plane indicated by the line 2—2 of Fig. 1. Fig. 3 is a vertical longitudinal sectional view of the same taken on the plane indicated by the line 3—3 of Fig. 1. Fig. 4 is a detail transverse sectional view of one of the grading bars, also showing the carrier belt therein. Fig. 5 is a detail elevation of one of the adjustable bearings in which the shafts and the direction pulleys are mounted.

In accordance with this invention a frame 1 is provided which may be of any suitable construction, and is here shown as comprising vertical corner posts 2, upper longitudinal bars 3, lower longitudinal bars 4 and cross bars 5. At the ends of the said frame and near the upper side thereof are shafts 6, 7 which are mounted in suitable bearings, indicated at 8. The said shaft 6 is a driving shaft and may be rotated by any suitable means, a belt pulley 9 being here shown on such shaft for the purposes of this specification. Each of the said shafts is provided with a plurality of pulleys 10 appropriately spaced apart, the pulleys on the shaft 6 being here shown as preferably somewhat smaller than those on the shaft 7. Within the scope of this invention any suitable means may be provided for adjusting the said pulleys on the said shaft. For the purposes of this specification each of the said pulleys is shown provided with a hub 11 on one side and a set screw 12 in said hub to secure said pulleys to said shafts when adjusted.

Shafts 13 which are below the said shafts 6, 7 are journaled in bearings 14 which are vertically adjustable on the frame, and the said shafts are provided with direction pulleys 15 which are disposed in vertical alinement with the pulleys 10 and are also adjustable on the said shafts so that they may be kept in alinement vertically with said pulleys 10 when the latter have been adjusted. The said pulleys 10, 15 are peripherally grooved and are connected together by endless carrier belts 16 which pass under the pulleys 15 and over the pulleys 10, and the upper leads of which are caused by the rotation of the shaft 6 to travel in the direction indicated by the arrows in Figs. 1 and 3. The said endless carriers are provided with arms 17 which extend transversely therefrom and are of suitable length. The said arms 17 are carried by the endless carriers independently of one another, that is to say, the arms of each endless carrier are not attached also to another endless carrier, the said arms extending from each of the endless carriers and terminating short of the next adjacent endless carrier.

In the ends of the frame 1 near the upper side thereof are inwardly extending brackets 18, here shown as secured by means of bolts 19 and provided with inclined inner portions 20 to which are secured cross bars 21, the said cross bars being each provided with a longitudinal slot 22. Grading bars 23, which are longitudinally disposed, are provided at their ends with inclined recesses or gains 24 to receive the said cross bars 20, and said grading bars are secured to the said cross bars by means of bolts 25 which extend through the slots 22 and hence adapt the said grader bars to be laterally adjusted so that they may be kept in alinement with the pulleys on the shafts 6, 7. Each of the said grading bars is provided on its upper side with a guide bar 26, the sides of which project laterally beyond the sides of said grading bars, the said guide bar having a longitudinal guide slot 27 in its upper side for the reception of and providing a guideway for the upper head of one of the endless carriers 16. The sides of the said guide bars are provided with steps or shoulders 28, 29, 30 of which any suitable number may be provided, according to the number of sizes into which the fruit is to be assorted, and the said guide bars of the respective grading bars being spaced apart form runways between them, which runways serve for the passage of the fruit longitudinally of the machine and widen toward the discharge end of the machine by reason of the provision of the steps or shoulders 28, 29, 30 hereinbefore described, and as will be readily understood upon an inspection of Fig. 1 of the drawings. It will also be understood that the arms 17 which are carried by the endless carriers 16 project across such runways and travel from end to end thereof.

By the provision of the vertically adjustable bearings 14 for the shafts 13, said shafts are rendered vertically adjustable so that the said endless carriers 16 may be kept as tight as may be required. The guideways of the guide bars 26 in which the upper leads of said endless carriers travel prevent lateral displacement of such leads of such carriers.

Inclined supporting bars 31 which diverge downwardly have their lower ends supported on the lower longitudinal bars 4 of the frame 1 and their upper ends supported by a longitudinal bar 32, the ends of which are secured to the centers of the cross bars 5. The said inclined bars 31 support downwardly inclined transversely extending chutes 33, 34, 35 which are made of canvas or other suitable flexible fabric or material and are respectively disposed under the shouldered or stepped portions 28, 29, 30 of the guide bars which form the sides of the runways, the chutes 33 being under the narrowest portions of such runways, the chutes 34 being under the next wider portions of such runways and the chutes 35 being under the next wider portions of such runways.

In practice the ends of the machine in which the shaft 6 is mounted will be disposed under the discharge end of a fruit table, and the fruit will be moved from such fruit table on to the assorting or sizing machine and directed into the inner ends of the runways, where the fruit will be caught by the arms 17 of the endless carriers and moved by the operation of such carriers longitudinally in the runways. Fruit of the smallest size will drop through the narrowest portions of the runways into the chutes 33 and will be discharged by gravity by such chutes into suitable receptacles. Fruit of the next size will drop through the next widest portions of the runways into the chutes 35, and so on, fruit of the very largest size being finally discharged from the rear end of the machine over the pulleys on the shaft 7, as indicated in Fig. 3. It will be understood that owing to the fact that the chutes which catch the fruit that drops through the runways are made of cloth or other suitable flexible or yielding material, the fruit is prevented from being bruised.

By initially adjusting the pulleys on the respective shafts and also adjusting the grading bars the width of the runways for the fruit may be varied as may be required by the character of the fruit to be assorted.

Having thus described the invention, what is claimed as new, is:—

1. A fruit sizer having laterally adjustable grading bars forming run-ways between them, shafts at the ends of such run-ways, pulleys on such shafts adjustable thereon to aline with such grading bars, and endless carriers operated by said pulleys and provided with arms extending transversely on such run-ways, the arms of each endless carrier being disconnected from and independent of the arms of any other endless carrier.

2. A fruit sizer having a main frame provided with cross bars having slots extending longitudinally of such cross bars, grading bars supported by such cross bars, adjusting bolts connecting such grading bars to such cross bars and operating in slots of the latter, shafts beyond the ends of the grading bars, pulleys on such shafts and adjustable thereon to aline with such grading bars and endless carriers operated by such pulleys and provided with arms projecting transversely from such carriers.

3. A fruit sizer having grading bars provided in their upper sides with guide-ways, endless carriers having their effective leads operating in such guide-ways, the latter supporting such leads and also initially supporting the fruit, and arms extending transversely from such endless carriers.

4. In a fruit sizer having endless carriers provided with transversely disposed arms to move the fruit, grading bars having guide-ways for the effective leads of such carriers and provided with flanges overhanging the edges of such carriers, such guideways supporting such leads of the carriers and also initially supporting the fruit.

5. In a machine of the class described, grading bars having guide bars on their upper sides extending laterally therefrom and provided with steps or shoulders forming runways between such grading bars, such runways widening in one direction, said guide bars having guide-ways in their upper sides, endless carriers having their effective leads operating in such guide-ways and supported by such guide bars and arms attached to such endless carriers and extending transversely of such run-ways.

In testimony whereof, I affix my signature in presence of two witnesses.

RUFUS P. REDMOND.

Witnesses:
JAMES H. BOYD,
LEWIS KRUGER.